Nov. 10, 1959 A. KINKEAD 2,911,932
TUBE MAKING MACHINE
Filed March 25, 1954 11 Sheets-Sheet 1
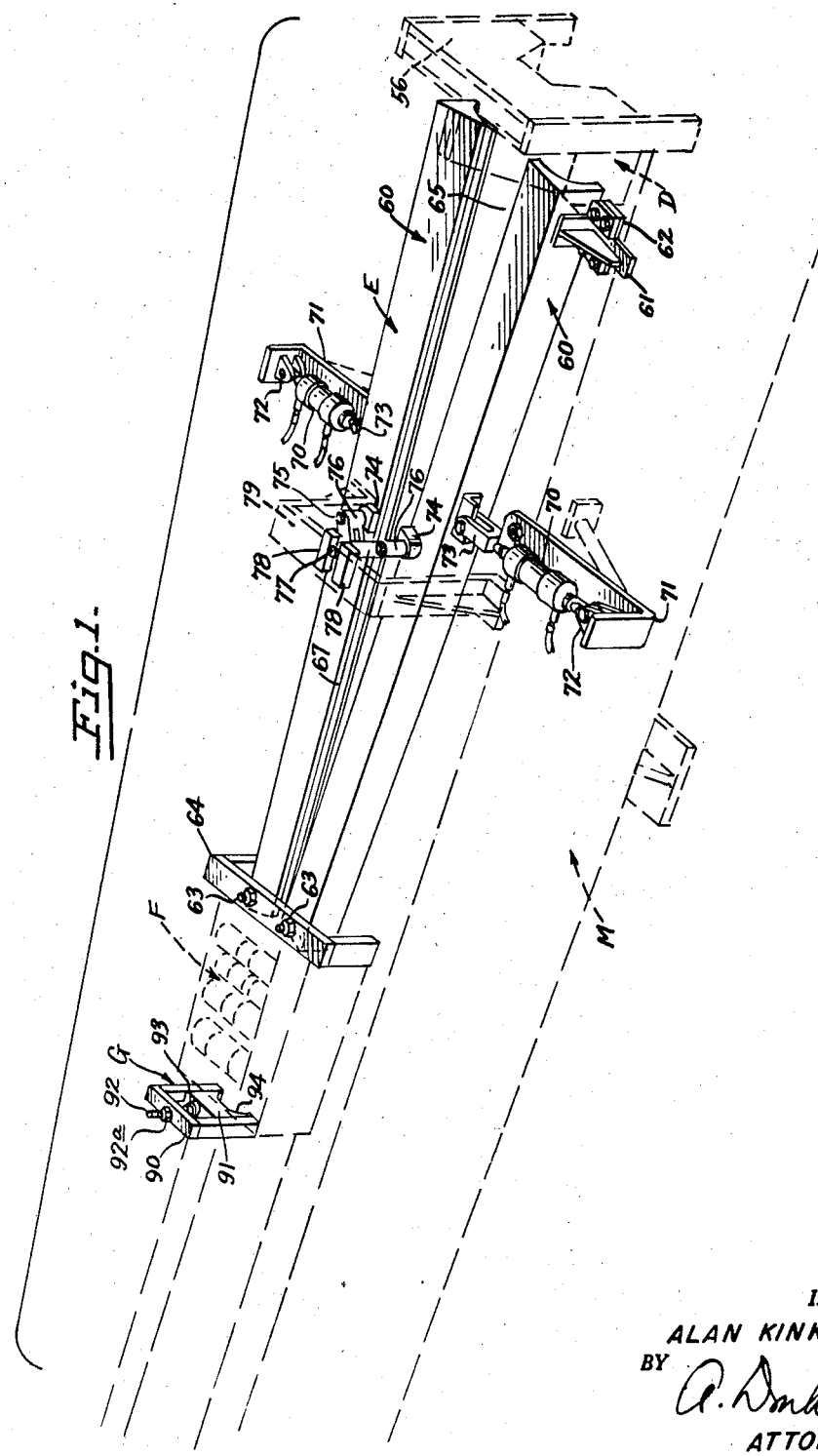
INVENTOR.
ALAN KINKEAD
BY
ATTORNEY Nov. 10, 1959  A. KINKEAD  2,911,932
TUBE MAKING MACHINE
Filed March 25, 1954  11 Sheets-Sheet 2
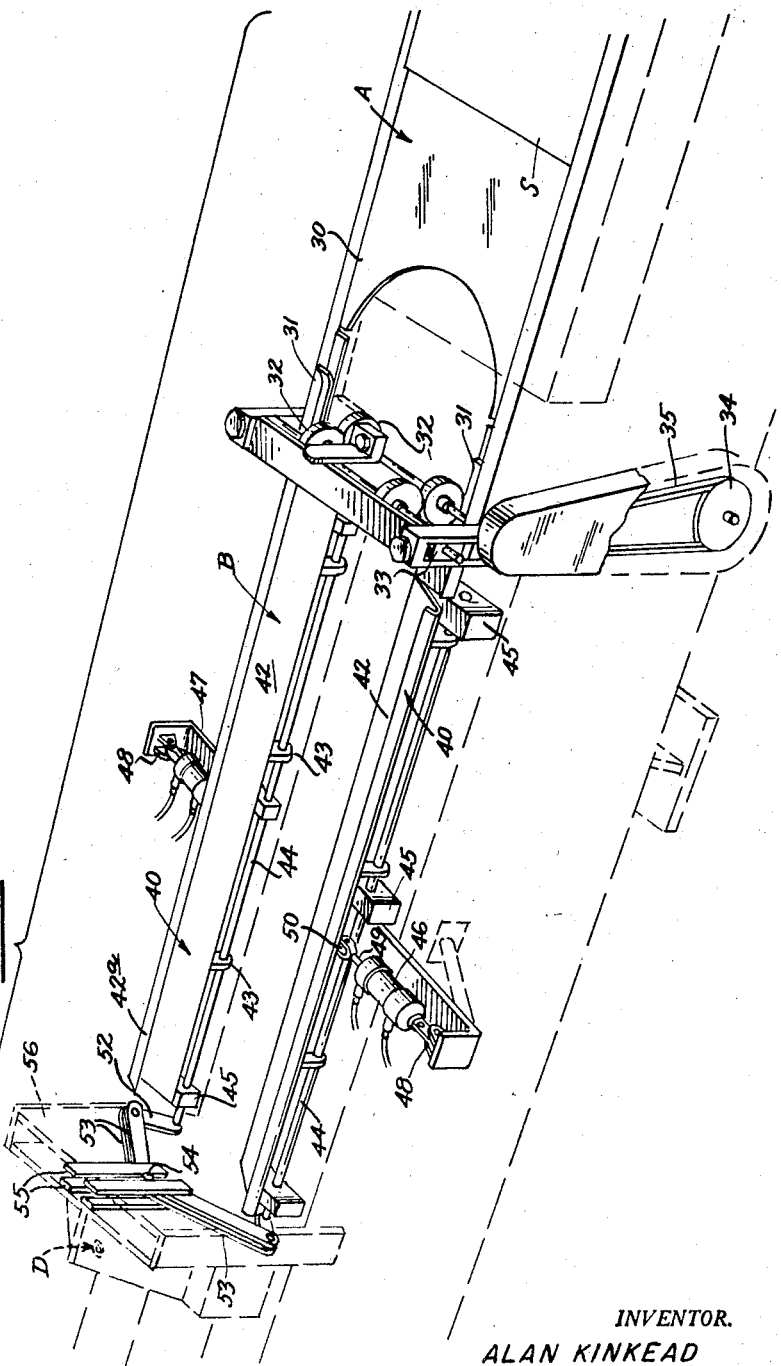
INVENTOR.
ALAN KINKEAD
BY
ATTORNEY

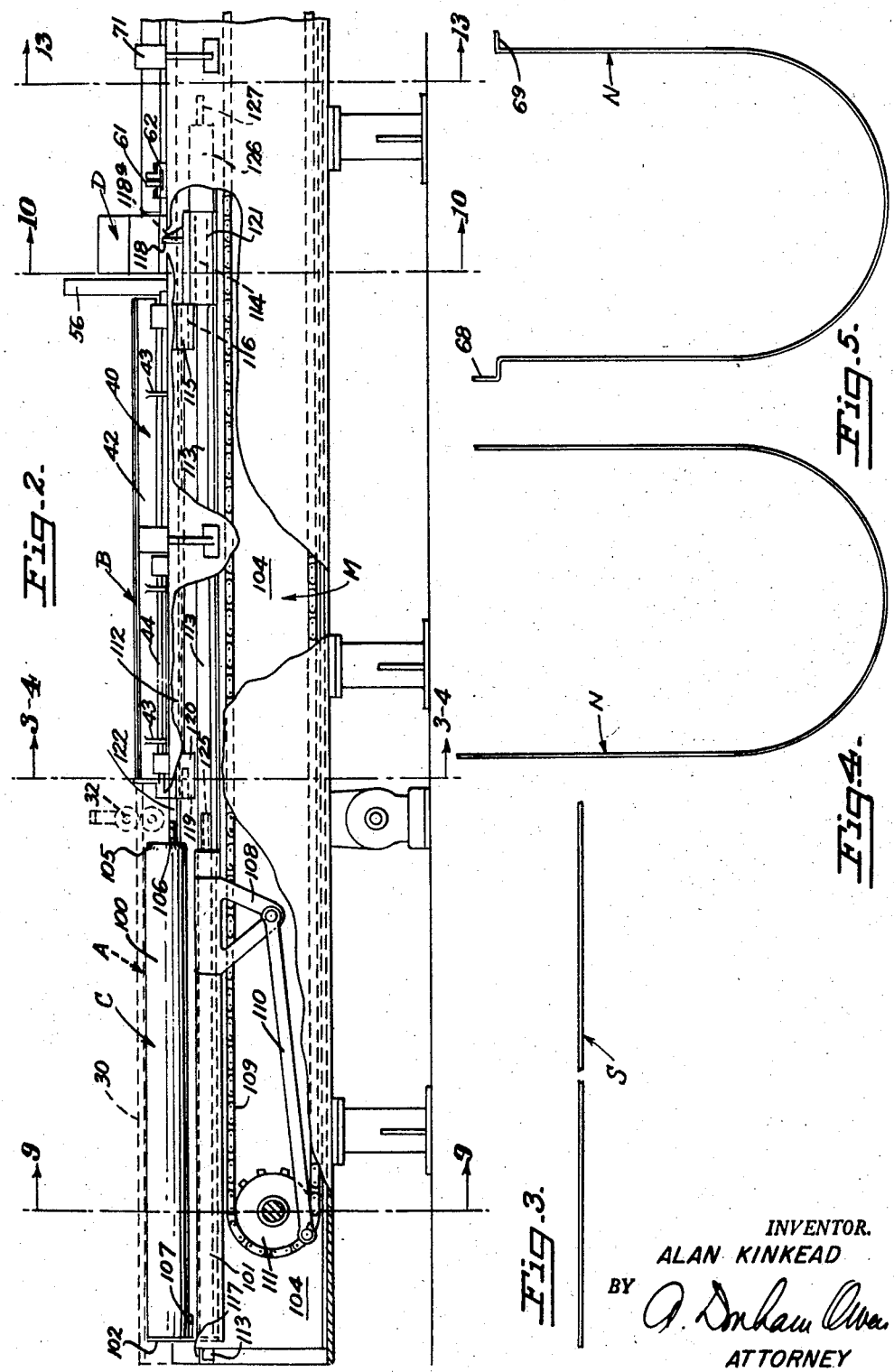

Nov. 10, 1959 A. KINKEAD 2,911,932
TUBE MAKING MACHINE
Filed March 25, 1954 11 Sheets-Sheet 4
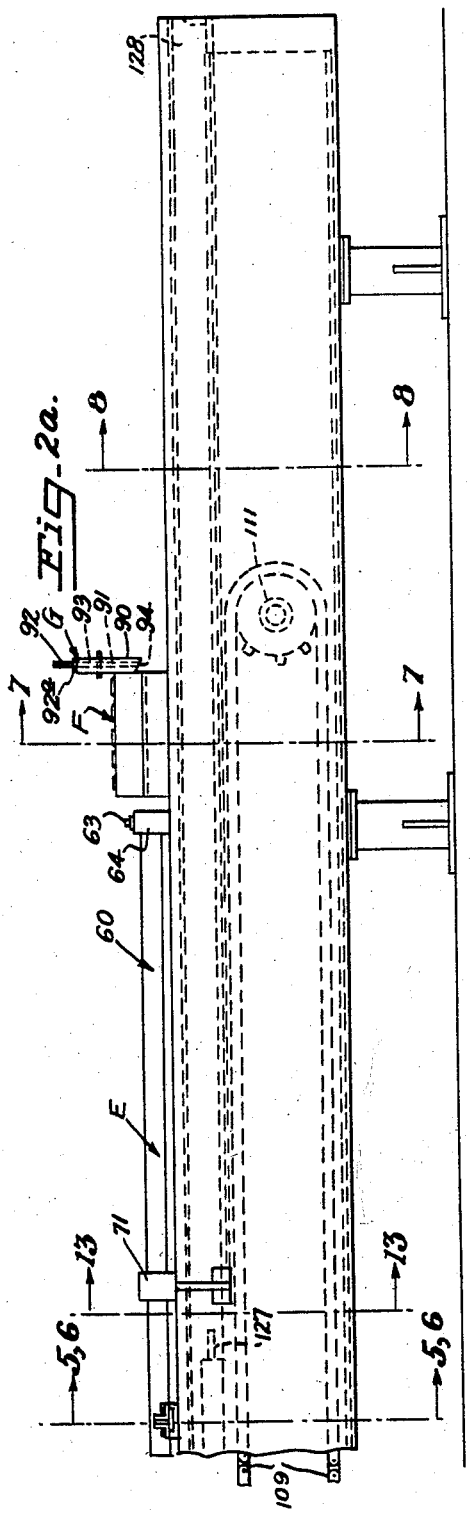
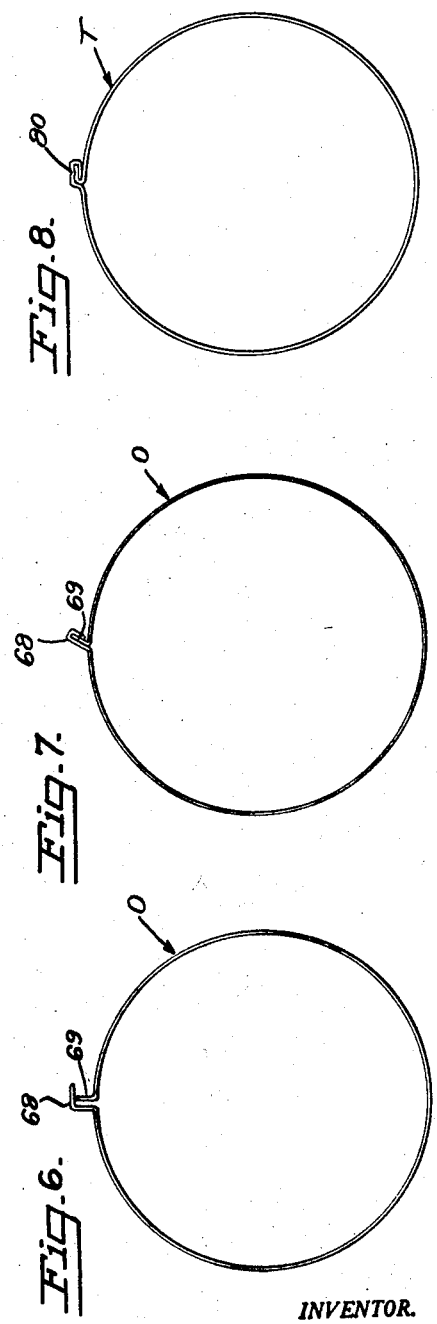
INVENTOR.
ALAN KINKEAD
BY
ATTORNEY

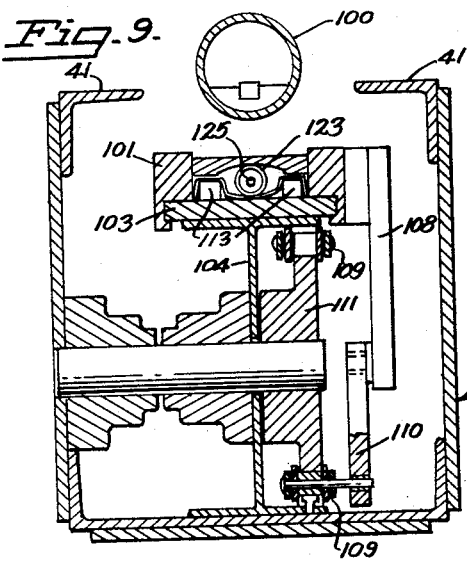
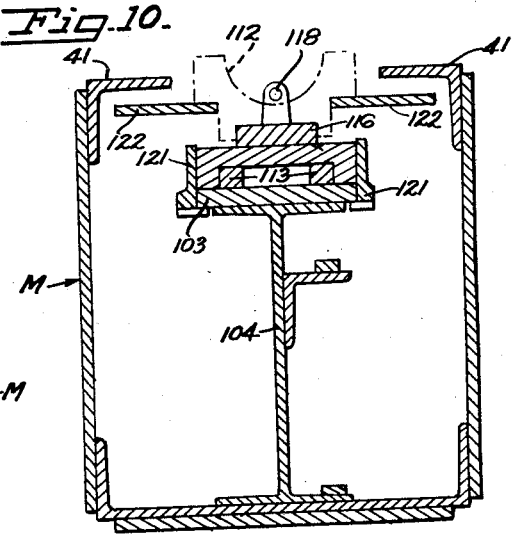
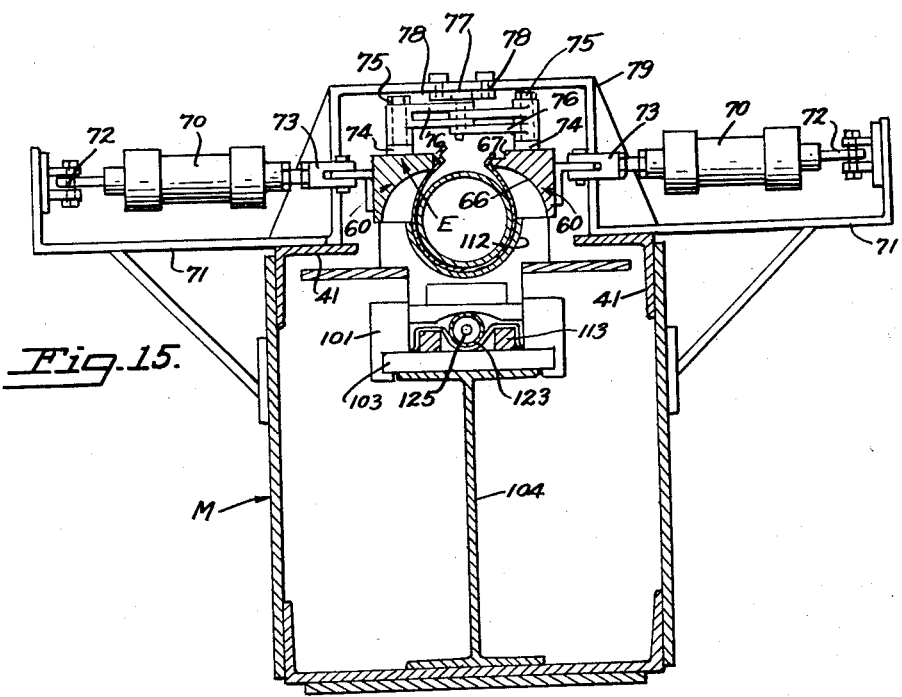

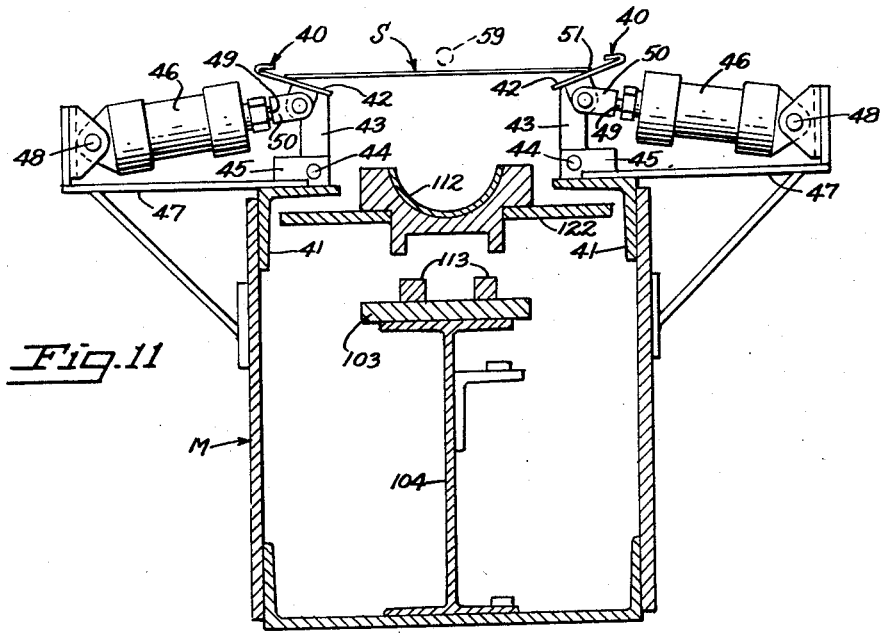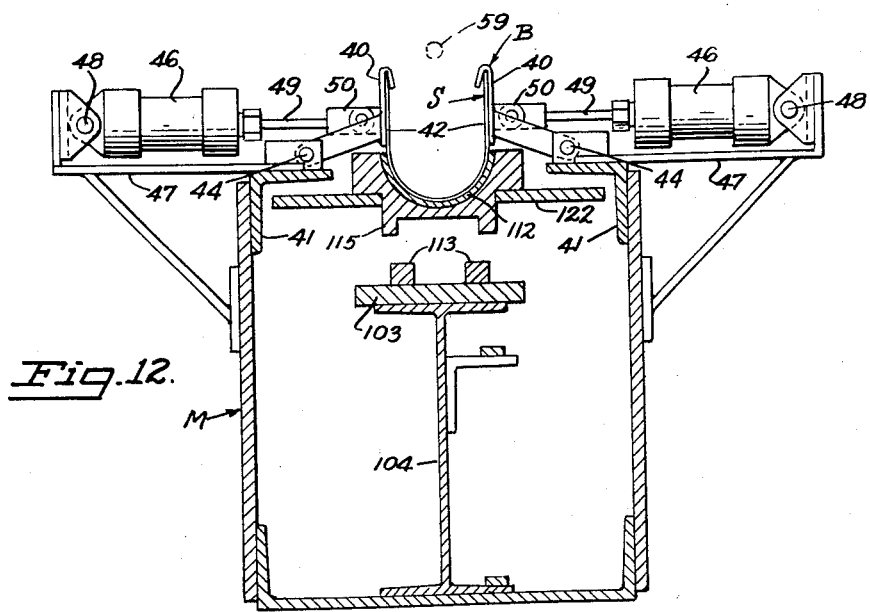

INVENTOR.
ALAN KINKEAD
ATTORNEY

Nov. 10, 1959     A. KINKEAD     2,911,932
TUBE MAKING MACHINE
Filed March 25, 1954     11 Sheets-Sheet 8
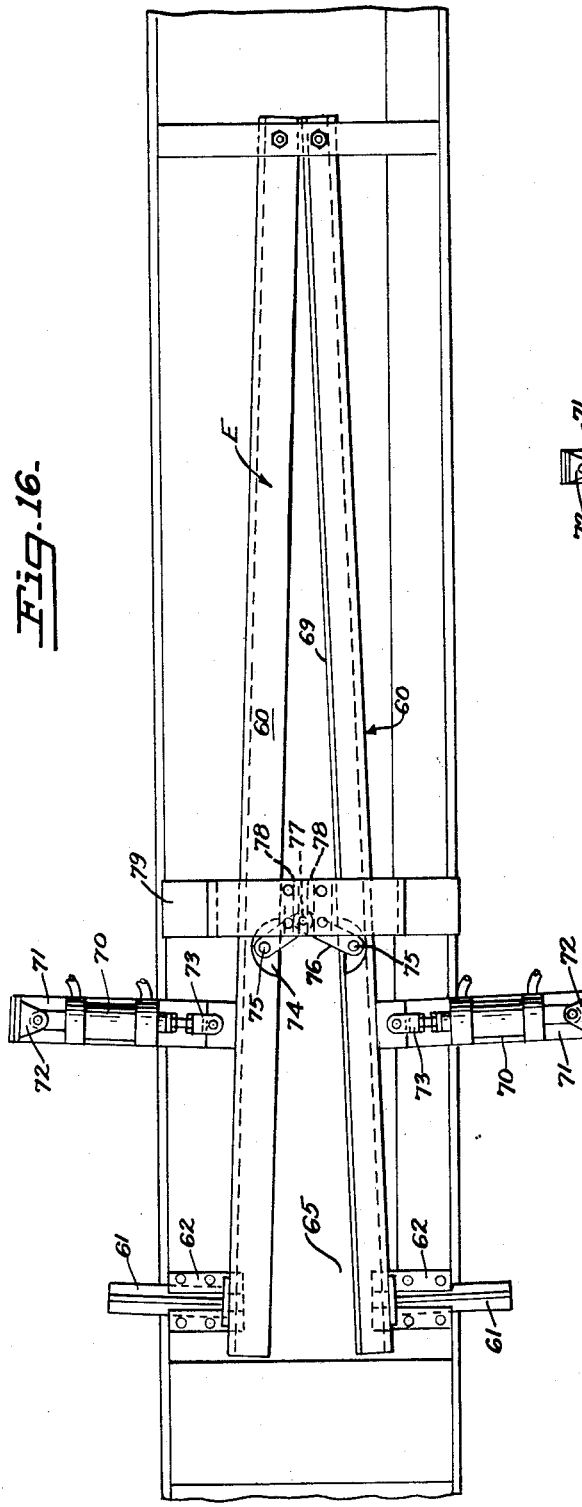
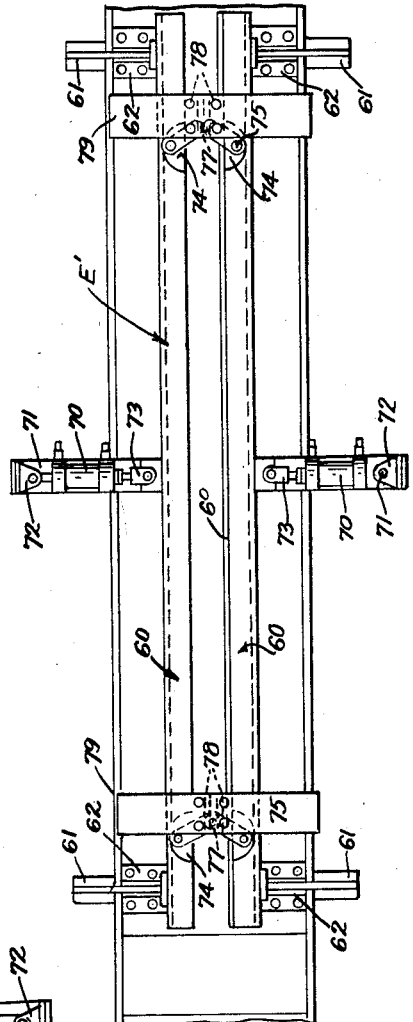
INVENTOR.
ALAN KINKEAD
BY
ATTORNEY Nov. 10, 1959  A. KINKEAD  2,911,932
TUBE MAKING MACHINE
Filed March 25, 1954  11 Sheets-Sheet 9

INVENTOR.
ALAN KINKEAD
BY
ATTORNEY

Nov. 10, 1959   A. KINKEAD   2,911,932
TUBE MAKING MACHINE
Filed March 25, 1954   11 Sheets-Sheet 10
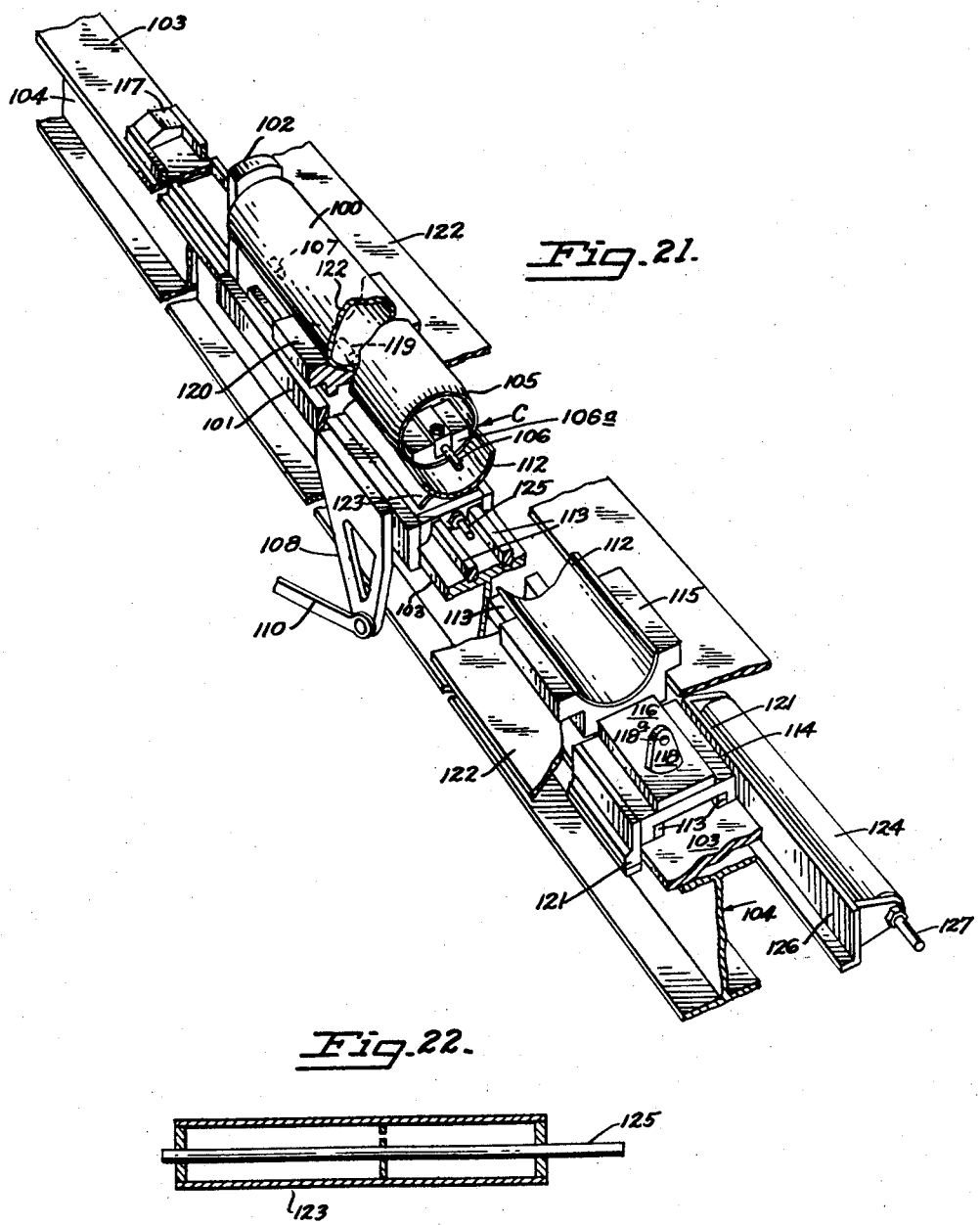
INVENTOR.
ALAN KINKEAD
BY
ATTORNEY

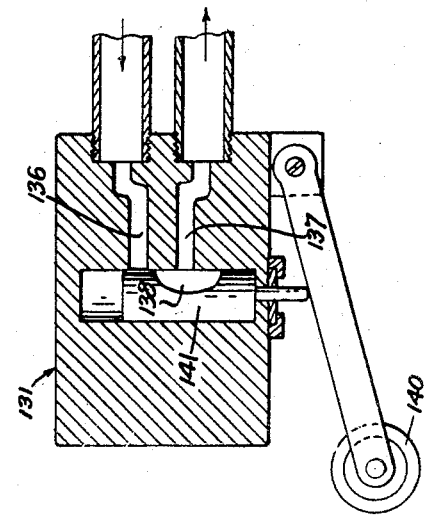

United States Patent Office 2,911,932
Patented Nov. 10, 1959

2,911,932
TUBE MAKING MACHINE

Alan Kinkead, Los Altos, Calif., assignor to William Wallace Company, Belmont, Calif., a corporation of California Application March 25, 1954, Serial No. 418,641

16 Claims. (Cl. 113—33)

This invention relates to an apparatus and a method for the continuous manufacture of lightweight seamed metal tubing, particularly from long single sheets of relatively thin sheet metal stock.

The present invention was brought into being following a long search for a machine capable of producing thin walled, unstressed, metal tubing from long, narrow substantially flat pieces of lightweight sheet metal stock.

The problem has been to find an economical and practical method and apparatus by which to produce thin walled seamed tubing of substantial length including the following features:

(a) The use of thin gage, lightweight metal of relatively little resistance to stretch, compression, or shear;

(b) The production of seamed tubing from thin, flat, long, narrow sheets of such metals without unduly stressing or tearing the metal in the process;

(c) The gathering and alignment of the sheet edges to be seamed prior to any tube seaming operation;

(d) The accomplishment of all the above with a relatively inexpensive machine and at low production costs.

The prior art has failed to reveal any machine or method capable of achieving these results.

In the prior art, the front end of the tubing is seamed and locked together rigidly while the following end has not yet been brought up to full round, consequently, the unjoined edges must be stretched so they are longer than the length of the sheet along its mid portion. Then they are shortened back to their original dimension when the seaming is completed. This results in deforming the sheet (stretching and compressing the edges principally) which makes it very difficult to form and seam properly. It means the edges must stretch at first, and as the seaming progresses the edges are contracted, all the while a delicate seaming operation is being performed. What happens frequently is that the seam gets away from the seaming wheels, and after seaming for a portion of the distance, the edges will suddenly get away and fly open. This stretching and then shortening of the material along the seam is the reason why in the prior art machines the forming mechanism must be so heavy and so accurately made and must be kept adjusted at all times.

The prior art machines have worked where the gage or wall thickness is sufficiently great with respect to the eventual tube diameter to absorb the stresses developed. However, with any of these prior art machines trouble has been experienced where the wall thickness of the tubing was thinner than about 1/50 of the diameter of the tube.

The invention described in the present application makes it possible on a single machine to make long sections of seamed tubing of very thin walled sheets (0.0025" to 0.005" or less) in a great range of lengths and in a wide variety of light weight materials (aluminum, copper, etc.).

The present invention solves the problems of making this walled tubing by forming and seaming the blank without stressing or straining the edges of the sheet because the dimensions do not change.

The method of this invention includes the steps of:

(1) Feeding long narrow substantially flat sheets of thin gage sheet stock into the former, (2) Applying pressure simultaneously to opposite sides of the sheet to deform it into a U-shaped blank, (3) Moving the extending edges of the blank laterally into alignment about a mandrel, and (4) Progressively seaming the aligned edges to form a completed tubing section.

Thin walled, unstressed, seamed tubing results from employment of this method, which may be very light in weight, and which has proven very successful in practice.

Another achievement of the invention is to provide machinery by which lightweight, thin walled, seamed tubing can be manufactured economically automatically or semi-automatically using thin gage sheet stock metals. Particular features of this machine reside in the novel structure of:

(a) A sheet receiving and folding mechanism pivotally operable to fold flat sheet-stock into U-shaped blanks, (b) A tube closing device, slidably operable to form closed tubing sections from said blanks without imparting undue axial compressive or tensile stresses to the thin gage material used, (c) A tube advancing mechanism to receive the folded blanks for movement through the tube closing and seaming stages of tube manufacture, and (d) A control system to insure the proper synchronization and sequence of operation of the aforementioned mechanisms.

Other objects and advantages of the invention will appear from the following description and from the drawings.

*The drawings*

In the drawings:

Figs. 1 and 1a present a perspective view of one form of the combined sheet folding and tube closing devices constructed according to the present invention, both shown in open positions, with associated portions of the tube making machine being shown in phantom outline.

Figs. 2 and 2a similarly present a view in side elevation of the entire machine of Figs. 1 and 1a taken looking toward the far side. Parts of the machine are broken away to show the tube advancing means, and the feeding station is shown in dotted outline for the sake of clarity.

Figs. 3 to 8 are cross-sectional views of the long narrow tube blank during various stages of its fabrication into a completed tube at the points indicated by the position lines 3—3 to 8—8 respectively of Figs. 2 and 2a wherein its shape corresponds to particular operating stages of the machine as follows:

Fig. 3 before operation of the sheet folding mechanism,

Fig. 4 after operation of the sheet folding mechanism,

Fig. 5 before operation of the tube closing device,

Fig. 6 after operation of the tube closing device,

Fig. 7 at one stage of the seaming operation, and

Fig. 8 after the seaming operation has been completed.

Fig. 9 is a view in transverse section along the line 9—9 of Fig. 2.

Fig. 10 is a view in transverse section along the line 10—10 of Fig. 2.

Fig. 11 is a view in transverse section along the line 3—3 of Fig. 2, showing the position of the sheet folding mechanism prior to actuation.

Fig. 12 is a view similar to Fig. 11 showing the position of the sheet folding mechanism after the sheet folding operation has been completed.

Fig. 15 is a like view showing the tube closing device in an intermediate closing position.

Fig. 16 is a plan view of the tube closing device of Fig. 1.

Fig. 21 is a perspective view of a tube advancing mechanism of a type that may be used to advance blanks from the folding device to the tube closing mechanism, showing its relation to the base frame, and with parts broken away for the sake of space and clarity of illustration.

Fig. 22 is a view in horizontal section of a shock absorber that might be used in combination with the advancing means of Fig. 21.

Fig. 23 is a diagrammatic view of a control circuit that may be used with the machine of the present invention.

Figs. 24 and 25 are cross sectional views of valves of a type that might be used in the control circuit of Fig. 23, with parts in elevation.

Fig. 26 is a plan view similar to Fig. 13 of a modified form of tube closing device constructed according to the present invention.

Figure 13:
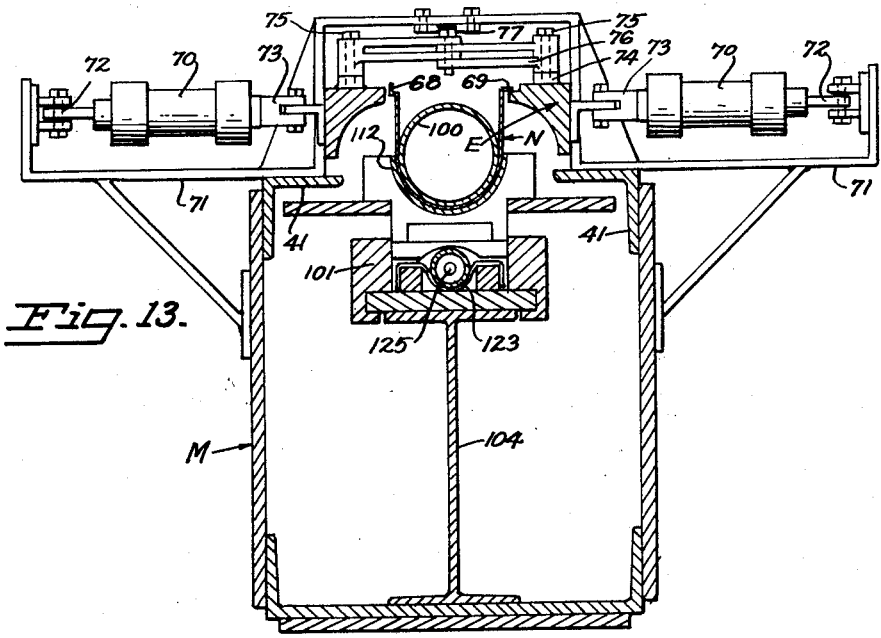
Fig. 13 is a view in transverse section along the line 13—13 of Fig. 2 or 2a showing the position of the tube closing device prior to actuation, with the advancing mechanism also shown in position below the device.

General description (Figs. 1, 1a, 2, 2a, 21, 23)

The machine here described is designed for automatic manufacture of light weight seamed tubing of any desired length. Flat sheets of long, narrow strip stock are fed individually from the feeding station A (Fig. 23) to a sheet folder B where the flat sheets are deformed by sidewise pressure into U-shaped blanks. The shaped blanks are then clamped between a boat portion and a mandrel portion of a tube advancing means C and moved lengthwise along the base frame M through edging rolls D to a tube closing device E. The device E closes the extending edges of the blank about the mandrel in one simple sliding motion before any portion of the closed tube reaches the seaming rolls F, so that no stretching or stressing occurs in the tube walls as they are formed. The tubes are then removed from the mandrel at the tube stripping station G and the tube advancing mechanism returns to the sheet folder B for another blank. Synchronization of the sheet folder, advancing means, and tube closing device in the proper operational sequence is accomplished by a control system H.

Feeding station (Figs. 1, 2, 23)

As best illustrated in Fig. 1a, the feeding station comprises a guide platform 30, edge guides 31, and powered feed rollers 32 to move single sheets of sheet stock into the sheet folder B. Only the lower rollers need be driven rollers, as a pressure bite may be provided by a vertically adjustable mounting 33 for the upper rollers 32. The power may be supplied by a drive pulley 34 and belt 35. Of course, the powered feed rolls are not essential as each long narrow sheet may be manipulated along the guide plate 30 by hand, if desired.

Preferably a number of pre-cut long, narrow flat sheets S (Fig. 3) are stacked on a rear portion of the platform 30 for movement one at a time into the edge guides 31. However, a roll of strip sheet stock may also be used by merely providing a cutting mechanism in combination with the guide platform 30. Such a device could be automatically, semi-automatically, or manually operated as desired.

Sheet folding mechanism (Figs. 1 to 4, 11, and 12)

The sheet folding mechanism B is in position to receive the flat sheets S when it is open as in Figs. 1a, 2 and 11. The sheet folder comprises two separate folding arms 40 pivotally mounted on supporting angle frames 41, on either side of the open topped main frame M. Each arm 40 includes a long, flanged plate section 42 and support rods 43 rigidly secured at their lower ends to the pivot shafts 44. The shafts 44 are rotatably mounted in bearing blocks 45 spaced at intervals along the supporting angles 41.

Fig. 11 shows the sheet folding arms 40 being held in an open position by air cylinders 46 which are supported on the main frame M by brackets 47. Each cylinder 46 is pivotally connected to a bracket by a forked joint 48 while its piston rod 49 is similarly connected to the adjacent folding arm 40 by another forked joint 50. In this way, each air cylinder is allowed sufficient freedom of movement so that upon actuation its piston rod 49 will readily move the folding arms 40 to the folding position of Fig. 12. The air cylinders 46 are of a standard two port design having two operating positions, and are controlled between the open and folding positions of Figs. 11 and 12 by the control system H.

The folding operation is accomplished as the flanged edges 42a of the pivoted folding arms 40 exert sidewise pressure on the adjacent edges 51 of the sheet S as they move from the position of Fig. 11 to that of Fig. 12. The long, narrow flat sheets S (Fig. 3) are quickly deformed by the one operation into long U-shaped blanks N (Fig. 4). The folding operation also depends on the synchronized position of the dished boat member 112 directly under the folding arms at the precise instant of folding. The boat 112 forms a part of the tube advancing means C, to be later described.

If desired, a lengthwise positioning rod 59 (dotted line position in Figs. 11 and 12) may be provided to prevent the sheets S from bowing outward during the sheet folding operation. Such a positioning rod would serve a precautionary function only, since the weight of the sheets S would cause them to sag downwardly causing downward folds in almost all cases.

It will be observed that no undue stresses are imposed upon the sheet S as it is folded into the blank N since the sidewise pressure, instead of compressing the sheet material, merely acts to partially deform the sheet into the evenly rounded dish form of the boat 112. At no time during the folding operation are intense shear or tensile stresses developed in the sheet stock.

To insure simultaneous, parallel movement of the two pivot arms 40 during the folding operation, a double link guide motion is provided at one end of the sheet folder B. This motion is provided by a pair of cranks 52 keyed to the shafts 44, and links 53 connecting the cranks 52 to a cam follower 54 riding in vertical cam plates 55. The plates 55 are secured centrally on the inside walls of a housing 56 which is rigidly attached to the main frame M at one end of the sheet folder. This mechanism insures that the pivot arms will move uniformly towards one another to provide the desired folding motion.

The folding operation is completed, immediately after actuation of the folding arms 40, by movement of a mandrel portion 100 of the tube advancing means C into a position directly above the boat 112. A front portion 105 of the mandrel is beveled so that its movement into and relative to the blank N and boat 112 tends to smooth out any unevenesses in the lower curved wall portion of the blank. The dished portion of the blank N is caught between the mandrel and boat and in this position, with its sides 57 extending upwardly, it is free to slide lengthwise out of the flanged sheet folding arms 40 to the next stage of operations.

Blank edging station (Fig. 5)

The blank edging station D includes opposing pairs of edging rollers (not shown) which transform the straight extending edges of the moving blank sides 57 into crimped edges, as shown in Figs. 4 and 5. The structure and operation of edging rolls of this type are well known in the prior art, and need not be further described or illustrated for the purposes of this invention. However, the particular form of the crimped edges, shown in Fig. 5, is important in the tube closing operation, as will appear.

Tube closing operation (Figs. 1, 2a, and 13 to 18)

The tube closing device E comprises two separate closing members or dies 60, each mounted for sliding movement above the main frame M by means of slides 61. The slides are secured to one end of members 60 and are free to move in guides 62 supported on the angle frames 41. In the preferred form of Fig. 1, the closing members 60 are provided with slides at one end only, the other ends being provided with closely spaced pivot mountings 63 so that, when open, the tube closing device is generally V-shaped with the open end facing the sheet folder.

The pivoted ends of the closing members 60 and pivot mountings 63 are supported on the angle frames 41 by a bracket 64. The sliding ends are likewise supported on the frames 41 by the guides 62. As best seen in Fig. 16, the guides 62 are designed to provide sufficient leeway for the swinging arc of the slides 61 during the closing operation of the members 60.

As leading portions of the U-shaped blank N emerge from the edging rolls at D, they enter the open space 65 adjacent the sliding end of the closing dies 60 when in the open position of Figs. 1, 13 and 16. As the blank N is moved further into the closing device by the advancing means C, the leading edges are inclined towards one another until the blank eventually attains the shape illustrated in Fig. 18 when it is completely within the members 60. At this precise point, the free sliding ends of the members 60 are swung about the vertical pivots 63 to close the entire blank about the mandrel 100 into a long closed, unseamed tube O. In this operation the trailing, open end of the blank is changed from the U-shaped blank form of Fig. 5 to the closed O shape of Fig. 6.

Figure 14:
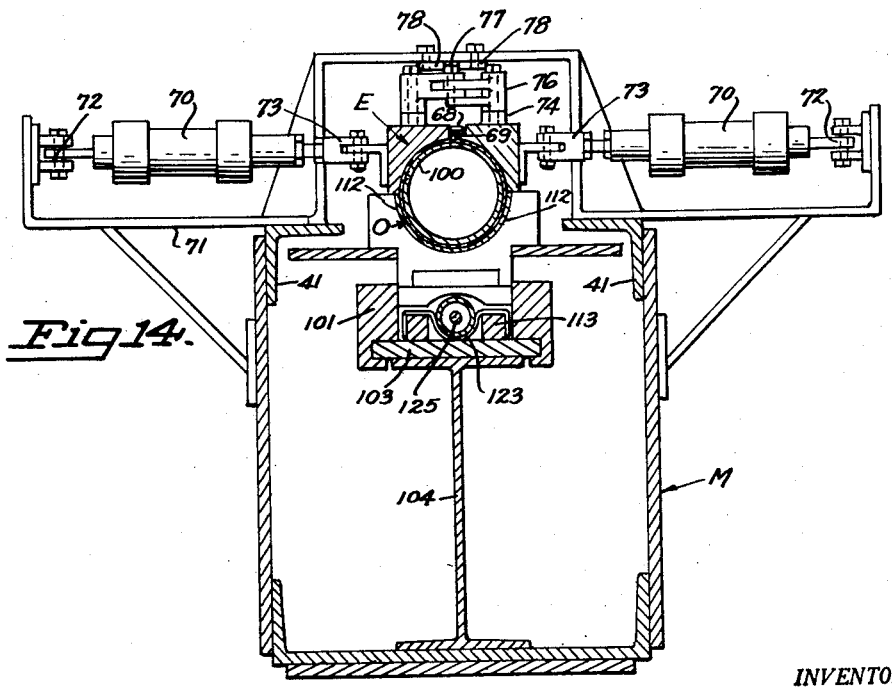
Fig. 14 is a view similar to Fig. 13 showing the position of the tube closing device after the tube closing operation has been completed.

To insure that the extending sides of the blank N are properly closed about the mandrel 100, the inner surfaces 66 of the closing members 60 are preferably designed to closely fit the outer curved surface of the mandrel. As a result, the subsequent advance of the mandrel 100 and tube O out of the closing device E will tend to smooth out any slight uneven spots that may occur in the tube surface. Also, the inner edges of the members 60 are carefully mated to insure that the crimped upper edges of the blank sides 57 will be properly aligned for the seaming operation to follow. As shown in Figs. 13 and 14, a square cut is taken out of one of the members at 67 to allow the crimped portion 68 to fall into place above the opposing crimped edge 69. It is noted that no additional crimping action occurs during the tube closing operation, but only a careful alignment of the previously crimped edges.

The closing movement of members 60 is effected by air cylinders 70 supported on the main frame M by the brackets 71. The cylinders 70 and cylinder mountings are similar in every respect to the sheet folding cylinders 46, except that the forked joint connections 72, 73 to the bracket 71 and closing members 60, respectively, are provided with vertical rather than horizontal pivots. This mounting permits sufficient freedom of movement to accommodate the swinging arc of the closing members.

The closing device E is likewise provided with a double link guide motion (Figs. 15 and 16) to insure uniform simultaneous movement of the closing members 60 toward one another. This motion is provided by spacer blocks 74, pivot pins 75, and links 76 connecting the closing members 60 to the cam follower 77 in a manner similar to that described in connection with the sheet folder guide. Horizontal cam plates 78 supported by overhead bracket 79 confine the motion of the pin 77 to a path lengthwise of the machine. In this way uniform closing and edge alignment of the tube are provided throughout the closing operation.

Figure 17:
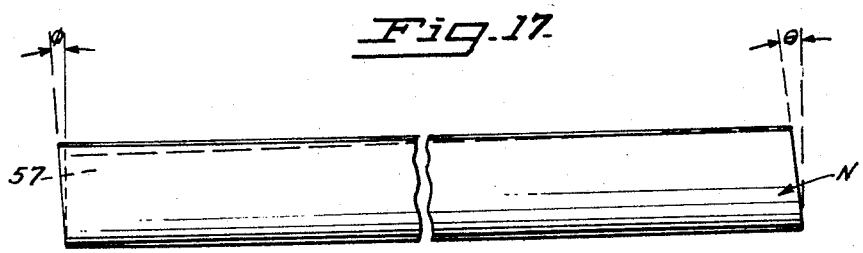
Fig. 17 is a view in side elevation of a long narrow tube blank as it would appear in the tube closing device just prior to actuation.
Figure 18:
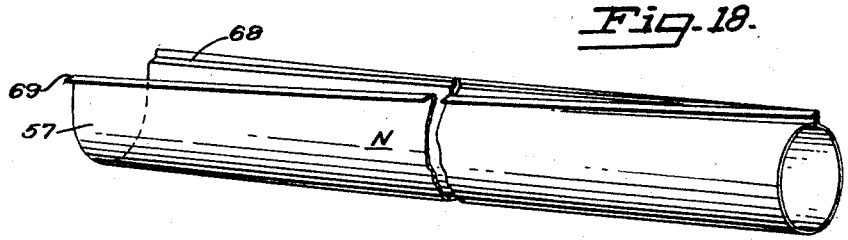
Fig. 18 is a perspective view of the tube blank of Fig. 17.

An important feature of the tube closing device E may be demonstrated with reference to Figs. 17 and 18. The full line position of Fig. 17 represents the shape naturally assumed by a U-shaped blank when one end is closed while the other end remains open, and corresponds to the shape actually taken by the blank N as one end is gathered in the tube closing device E. The dotted position represents the shape naturally taken by a closed tube, and corresponds to the actual shape of the closed tube O, after actuation of the closing device.

It is a unique characteristic of the present invention that the tube closing device E permits the tubing blank to assume any natural, unstressed position, such as the dotted position of Fig. 17 at any time during the tube closing operation. This is possible because the upwardly extending blank walls are free at all times to slide lengthwise along the inner edges of the closing members 60. As a consequence, the blank may adjust itself from a normal inclined position during the gathering operation to the normal vertical position of a closed tube. This movement would be a simple sliding movement through the arc represented by the angles $\phi$ and $\theta$ of Fig. 17, and is accomplished simultaneously with the actuation of the closing device E.

It is clear that to seam one end of the tube into the desired vertical alignment simultaneously with a gathering of the normally inclined trailing tube portions, as in prior art machines, it is necessary to lengthen the tube wall a distance comparable to the angle $\theta$. Likewise, the tube will have to be shortened a distance comparable to the angle $\phi$ before the trailing end of the tube will also be in vertical alignment. For very thin gage sheet metal stock, such stretching and shortening makes it very difficult to form the seam unless the rolls are perfectly adjusted at all times. In the present device, the sliding action allowed by closing device E avoids any such stretching or shortening and permits the use of light weight materials.

Seaming operation (Figs. 6 to 8, 19, and 20)

Figure 19:
Fig. 19 is a view in side elevation of a completed tubing section fabricated according to the present invention.
Figure 20:
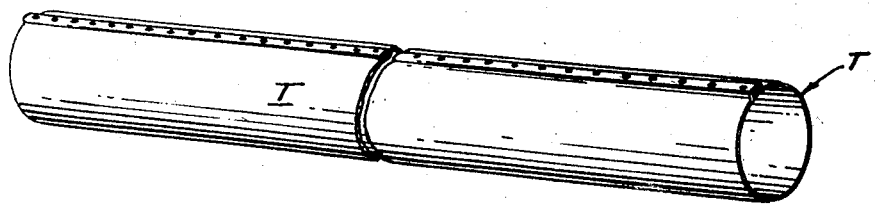
Fig. 20 is a perspective view of the tubing section of Fig. 19.

In the present invention, the seaming operation is performed only after the tube blank N has been completely closed about the mandrel to form the closed tube O. In this closed position (Fig. 6) the crimped edges 68 and 69 are aligned for the subsequent seaming operation. Preferably the seaming operation is performed by a series of seaming rolls F by gradual stages. An intermediate position of the tube, while being seamed, is illustrated in Fig. 7. Figs. 8, 19 and 20 show a completed, seamed tube T. The crimped edges 68 and 69 have been flattened against the tube and then secured in that position by a series of punched depressions 80 imparted by the last of the seaming rolls. The structure and operation of the seaming rolls F form no part of the present invention and being well known in the prior art are not further described or illustrated. It is apparent that the seaming operation could also be performed by welding or any other well known process. It is only important for the purpose of the present invention that the seaming operation be of a type that may be accomplished after the blank N has been completely closed into a long tube O.

Tube stripping station (Figs. 1 and 2a)

After the seaming operation, it is necessary to remove the completed tube T from the mandrel 100 so that the advancing means C may return to the sheet folder to pick up another folded blank from the sheet folder B. For this purpose, a simple tube stripping device G may be provided. The device G includes a bracket mount 90 secured to the housing for the seaming rolls F. Mounted for vertical sliding motion in the bracket 90 is the spring biased cam plate 91. Secured to the cam plate and extending upwardly through an aperture in the bracket is a slide bolt 92. The downward movement of the cam plate is limited by a nut 92a threaded on the top of the bolt 92, while its upward movement is resisted by the spring 93 between the bracket 90 and the top of the cam plate. The lowermost position of the cam plate is one just contacting the rounded upper surface of the mandrel 100; consequently, the lower edge of the cam plate has a correspondingly rounded surface.

The stripping action is effected by a beveled edge 94 on the lower rounded cam surface which causes the cam plate 91 to raise above the tube T allowing it to pass underneath. As the tube advancing means C reverses direction, however, the rear end of the tube will be engaged by the opposite side of the cam plate and stripped off the mandrel. The completed tube may then be removed by hand or dropped onto a conveyor belt as desired.

Tube advancing mechanism (Figs. 2, 9 to 15, and 21)

As has been indicated, each flat sheet S is folded into a blank N by the sheet folder B. At this point the blank N is engaged by the advancing means C for movement through the edging rolls D, tube closing device E, seaming rolls F, and stripping station G. During this movement the blank N is converted to a closed tube O, seamed into a completed tube T, and then removed from the machine; the letters N, O, and T merely indicating the various shapes impressed on the original flat sheet S.

A particular form of the advancing mechanism C, designed to accomplish this movement quickly and efficiently, is best illustrated in Figs. 2 and 21. Broadly, the tube advancing means C comprises two relatively sliding members, one a U-shaped member lying on its side and including the mandrel 100 as the upper leg of the U, the other a J-shaped member lying on its side and including the boat 112 as its upper and shorter leg. For simplicity of description these two members may be termed horizontal U and J members that are adapted to come together with their open ends facing each other. One leg of the U or J member, in each case, slides along the frame; while the other leg is above and parallel to the sliding portion. Each of these upper legs engage the blank N for lengthwise movement along the frame M after the folding operation. The sliding U and J members are closed against each other during this movement. After a tube is completed the sliding members open or disengage during return movement with the J-member lagging the U-member, by means of a lost-motion connection so as to be in the proper relative position to receive the next folded blank.

Referring to Figs. 2 and 21, the sliding U-member is shown at the left with the open end of the U at the right, and comprises the mandrel 100 as the upper leg and a mandrel carrier including a cross head 101 as the lower leg, and connecting back plate 102 as the bowl of the U. The cross head 101 is slidably mounted on a machined guide bed 103 secured to a heavy I beam 104 which is supported on the main frame M (Fig. 9). The mandrel 100 is hollow and has a beveled leading end 105, inside of which is forwardly protruding aligning pin 106, mounted for vertical adjustment in a bumper 106a. A similar pin 107 protrudes from the back plate 102. Completing the mandrel U-member is a downwardly extending drive bracket 108.

As best seen in Figs. 2 and 9, the mandrel U-member is moved to and fro along the guide bed 103 by a drive chain 109 connected to the drive bracket 108 by the heavy link 110. The drive chain 109 is supported on sprocket wheels 111, one of which is driven by a motor (not shown). The movement of the chain lengthwise along the frame imparts a smooth uniform movement to the mandrel 100 for all positions of the link 110 between the sprocket wheels 111. As the link 110 moves about a sprocket wheel, however, the mandrel is momentarily slowed and stopped as its direction is reversed.

The sliding J-member is shown adjacent the mandrel and comprises a boat 112 as its upper, shorter, horizontal leg and a supporting bridle member including parallel slide bars 113 as its lower, longer, horizontal leg and a connecting pickup plate 114 as the bowl connecting the legs 112 and 113. The pickup plate 114 is rigidly secured to one end of the boat 112 by means of a boat nose member 115 and support plate 116. The parallel slide bars 113 are likewise rigidly secured to the pickup plate 114 and extend lengthwise along the guide bed 103 and through the mandrel supporting crosshead 101. The extending ends of the parallel slide bars 113 are secured together by a contact plate 117.

The parallel slide bars 113 are considerably longer than the boat 112 and constitute the long portion of the J-member sliding through the mandrel U-member above the guide bed 103 (Figs. 2 and 9). The boat J-member is slidably supported on the guide bed 103 by crosshead members 121 and is also supported by the sliding boat nose and end members 115, 120 on lengthwise frames 122 supported at their ends by the main frame M (Figs. 10 to 15).

It will be observed that the boat J-member is not driven, but moves only through motion imparted to it by the mandrel U-member as will be later explained more fully.

In a return position of the tube advancing means C the relative positions of the sliding mandrel and boat members are those shown in Fig. 2. In this position, the boat 112 is uncovered and free to receive the long folded blank N from the sheet folder B. As the link 110 moves about the left hand sprocket wheel 111, the mandrel member 100 starts to accelerate rapidly and moves into the boat member with such speed that the inertia of the boat member will prevent movement of the boat 112 until the blank N is sandwiched between the mandrel 100 and the boat 112. For the purpose of assuring accurate alignment of the U and J members, aligned apertures 118a, 119 may be provided in a contact member 118 above the support plate 116 and in the boat end contact member 120 to receive the aligning pins 106, 107, respectively. As previously explained, the boat J-member is so mounted that it is free to slide with the mandrel U-member and the blank N held therebetween, and it is pushed by the mandrel bumper 106a and back plate 102 respectively engaging the boat contact members 118 and 120.

In the position of the tube advancing means C, just described, the tube forming blank N is moved through the various stages of tube manufacture at D, E, F and G until the direction of the advancing means is reversed by movement of the link 110 around the right hand sprocket wheel 111. As the mandrel U-member accelerates rapidly in the opposite direction, the inertia of the boat J-member causes the two members to become disengaged and to slide apart into a position similar to that shown at the left hand of Fig. 2. The completed tube T is removed from the mandrel 100 in the initial stages of this return movement by the stripping device G, as previously described. After the desired lagged distance has been covered by the mandrel 100, the back plate 102 engages the contact plate 117 of the boat, and the mandrel then pulls the boat back with it at that lagged distance. The return movement of the mandrel and boat also provides time for a new sheet S to be fed to the sheet folder B before these respective parts of the tube advancing means C are again in the blank receiving position of Fig. 2.

It is apparent from the above that the engagement, movement, and release of the two sliding members relative to each other depends solely on the rapid to-and-fro movement of the mandrel U-member and inertia of the boat J-member. In other words, a lost-motion connection is provided by the spacing between the contact member 118 and the contact plate 117 being considerably greater than the spacing between the black plate 102 and the bumper 106a. In order to insure against damaging shocks from the impact of these two members, shock absorbers 123, 124 are provided on the mandrel and boat members respectively. In the form of advancing means illustrated, the mandrel shock absorber 123 is located between the parallel slide bars 113, inside the mandrel crosshead 101. The shock absorber 123 may take any well known form, such as the dash pot illustrated in Fig. 22. The shaft 125 of the mandrel shock absorber is adapted to contact either the boat pickup plate 114 or the contact plate 117 depending on the stage of operation.

The boat shock absorber 124 is shown attached to an extending portion 126 of a boat crosshead member 121, and is similar in construction to the mandrel shock absorber 123. Its shaft 127 is adapted to contact decelerating stops on either end of the main frame M, such as 128 (right end of Fig. 2). The position of these stops depends, of course, on the particular design of the advancing means C.

Control circuit (Figs. 23 to 25)

It is apparent that a carefully designed control circuit is required to synchronize properly the various movements of the tube advancing means C with the progressive operations of the sheet folder B, and closing device E.

Fig. 23 illustrates a convenient compressed air circuit H that might be used in the present invention. An air pressure inlet line 129 extends the length of the base frame M and has branch lines 130 to the various pilot and control valves. Pilot valves 131, 132 and 133 are designed to contact the various moving parts of the tube advancing means C during the sequence of operation. These pilot valves are illustrated in a representative form shown in Fig. 24. Four-way control valves 134 and 135 are also included in this circuit and may be of the slide type illustrated in Fig. 25.

The operation of the control circuit is as follows. In an extreme return position of the mandrel member, the mandrel crosshead 101 will contact the roller 140 of the pilot valve 131 raising the valve member 141. In its raised position the member 141 allows air pressure to flow through the pilot valve passages 136, 137 and the valve slot 138 to the control valve 134 where it will push the slide valve spool 139 to one side. The new position of the spool will reverse the air pressure in the air cylinders 46 by redirecting the inlet air from conduit 150 into conduit 151 causing the sheet folder B to operate to fold the sheets S into the blanks N. At this instant the boat end 120 also contacts the pilot valve 132 which similarly actuates control valve 135 and air cylinders 70 to open the tube closing device E.

These positions of the valves 134, 135 and air cylinders 46, 70 remain unchanged until the boat nose 115 moves sufficiently far into the tube closing device E to contact the pilot valve 133. Actuation of the valve 133 performs the dual function of reversing the positions of the spool valves 139 in control valves 134 and 135, thereby opening the sheet folder B at the same time that the tube closing device E is closed.

The tube advancing means C continues its movement through the seaming and stripping operations at F and G and then starts the boat 112 on its return movement. As the boat again passes under the closing device E, the boat end 120 contacts the pilot valve 133; but since both the sheet folder B and closing device E are already in open and closed positions, respectively, no new operation occurs. The cycle recommences when the mandrel carrier 101 and boat end 120 again contact the pilot valves 131 and 132, respectively, closing the sheet folder B and opening the tube closing device E.

Operation

Briefly, the operation of the tube making machine is as follows. A flat sheet S of strip stock is fed from the feeding station A along the guide platform 30 to the powered feed rolls 32 where it is guided through edge guides 31 into the sheet folder B. This feeding operation may occur in the control cycle just after the sheet folding arms 40 have opened.

When the chain 109 moves the opened disengaged advancing means C to the extreme return position, the mandrel carrier 101 will contact pilot valve 131 closing the sheet folding arms 40 of the sheet folder B. The pivoted movement of the arms 40 causes the flanges 42a to exert sidewise pressure on the long narrow sheet S causing it to deform downwardly into the upper curved surface of the boat 112 to form a U shaped blank N. This entire folding operation is performed without exerting any stretching or compressing of the edges to be seamed, and without requiring any severe or unsafe impacts between moving machinery parts.

The mandrel 100 then moves into the blank N, above the boat 112, thereby holding the blank N to the advancing means C for sliding out of the sheet folder B to subsequent tube forming operations along the length of the machine.

The first of these operations is performed at the blank edging station D where the upwardly extending sidewalls 57 of the blank N are crimped as in Fig. 5. As these crimped edges emerge from the edging station they are slidingly gathered by the inner edges of the open closing members 60. When the blank has progressed completely into the closing members, the boat portion 115 of the advancing means C contacts the pilot valve 133 actuating the air cylinders 70. The air cylinders 70 slide the members 60 into a closed position, thereby closing the blank N about the mandrel 100 to form a closed tube O (Fig. 6). This tube closing operation is accomplished without any stretching or compressing of the edge of the tubing wall since the crimped upper edges of the blank are free to slide relative to each other throughout the closing motion of the arms 60. This is possible, in part, because no portion of the tube is seamed before it is converted to the tube form of Fig. 6, from the blank form of Fig. 5 or 17, and also because of the novel structure and functioning of the closing device E.

After actuation of the closing device, the tube advancing means continues to move, sliding the tube O out of the device E into the seaming rolls F. The rolls F progressively seam the crimped edges 68, 69 from the aligned positions of Fig. 6 to the flat interlocked position of Figs. 8 and 19. The completed tube T then emerges from the seaming rolls, and is stripped from the mandrel 100, as it disengages from the boat 112 in its return movement, by the cam faced stripping device G. The tubes T are removed from the machine by hand or by a conveyor belt for future use. The conveying means C now returns in an open extended position to receive another long narrow folded blank N from the sheet folder B.

It will be observed that the operation of tube making is continuous and progresses in sequence from a long narrow flat sheet S to a completed tube T under the control of the circuit H. A complete sequence of operations required to form one tube T, takes but a matter of seconds and averages about 8 to 12 seconds per tube on the machine illustrated. In order to stop or start the machine, it is only necessary to start or stop the drive motor for the drive chain 109, which may be accomplished by the usual switch (not shown).

Once started, the novel combination of structures and synchronization of functions that comprise the machine permit all the various folding, edging, closing, and seaming operations to be performed on a moving tube blank without at any time unduly stretching or compressing the material forming the tube wall. As a consequence, it is possible to use unusually thin gage, lightweight metal as the material for the tube construction. This feature makes possible the production of long perfectly formed, lightweight, thin-walled tubing sections hitherto impractical on prior art machines.

*Modifications*
(Fig. 26)

A modified form of the tube closing device E, designated E', is shown in Fig. 26. In this form, the closing members 60 are mounted for parallel sliding motion towards each other instead of the pivoted sliding motion of the closing V form of Fig. 1 or 16, etc. Each of the sliding closing dies 60 is provided with a plurality of slides 61 and cooperating guides 62, as before, except that no leeway for a swinging motion of the slides need be provided.

To insure simultaneous, parallel sliding movement of the two closing dies 60 towards one another during the closing operation, a plurality of double link guide elements are provided between the dies 60, along their length. Each of these elements may take the form previously illustrated including the spacer blocks 74, pivot pins 75, links 76, cam followers 77, and horizontal cam plates 78. Likewise, the closing movement of the members 60 may be effected by the air cylinders 70, as before.

In the operation of this modified closing device E', the U-shaped blank N moves between the opened closing members 60 in the manner previously described, except that the leading edges of the blank N are not gathered together at one end before the members 60 are closed. Upon actuation of the air cylinders 70, the members 60 again close the sides 57 of the blank N about the mandrel 100 to form a completed tube T. The operation of the machine in all other respects is the same as before.

Other modifications that are clearly within the scope of the present invention are hydraulic or electrical control systems H; manual feeding of the sheet S directly to the open folding arms 40 instead of by means of the sheet feeding device A; or modified procedures for seaming the tube O or stripping the tube T from the mandrel, to suggest just a few. It is obvious that many additional changes in construction and widely differing embodiments and applications of the invention will suggest themselves to those skilled in the art to which this invention relates without departure from the spirit and scope of the invention. The disclosures and the description herein are purely illustrative and are not intended to be in any sense limiting.

What is claimed is:

1. In a pipe making machine, a base frame of extended length; a blank receiving and folding means for flexing a flat blank to a U-shape; a longitudinally movable cylindrical mandrel; means for holding said blank against said mandrel for movement therewith; means for crimping the edges of said flexed blank; blank-closing means, comprising two longitudinally extending members with generally quarter-cylindrical faces mounted longitudinally on said frame each mounted at one end for sliding lateral movement with respect to said frame, and having a pivoted connection to the frame at the other end whereby said flexed blank has its vertically extending portions forced in toward said mandrel by said closing faces; and means mounted to said frame on horizontal pivots and having pivotal connections to one end of said blank-closing means, for moving the slidably-mounted end thereof in toward the mandrel, to close said blank about said cylindrical mandrel while the walls of said blank are free at all times to slide lengthwise along the faces of said closing means, so that the tubing blank assumes a natural, unstressed position with the crimped edges closed but unlocked.

2. The machine of claim 1, having in addition seaming means for locking said edges of the blank together as said blank is propelled by said mandrel, after the closing of the entire longitudinal edges of the blank has been completed.

3. The machine of claim 1 in which said means for moving the slidably mounted end comprises pneumatic cylinders pivoted on said frame with their pistons respectively pivoted on said blank-closing means, and in which the air for said cylinders is controlled by the longitudinal position of means moved by said mandrel along said frame and by the direction of its movement.

4. A tube-forming machine for producing a pipe section from a flat blank of thin metal stock, including in combination: means for engaging only the longitudinal edges and adjacent margins of a stationary blank and moving said edges laterally toward each other, thereby freely flexing said blank into U-shape as seen in cross-section without bringing undue stress to bear upon it; semicyclindrical support means for shaping and supporting the bowl portion of said U-shaped blank; a longitudinally movable cylindrical mandrel; means for moving said mandrel longitudinally uninterruptedly from a beginning position beyond said blank into and over said blank, overlying and in contact with the bowl portion of said U-shaped blank to thereby smooth out and catch said flexed blank between said mandrel and said semicylindrical support means, the movement of the mandrel continuing in the same stroke to an end position; means for then returning the mandrel to its beginning position; a lost-motion connection between said support means and said mandrel for moving said support with said mandrel, the movement beginning when said mandrel overlies said blank and continuing to said end position and then for lagging said support means behind said mandrel on the return stroke so that said mandrel retracts fully from said support means before said support means begins its return movement; means for successively crimping the edges of, closing and seaming said blank about said mandrel during its uninterrupted movement therewith to said end position; and means for stripping said blank from said support means during the return of said support means.

5. The machine of claim 4 in which the seaming means does not act on said blank until the closing means has completely finished its action on the entire blank, so that no new stresses are set up on said blank during the seaming operation.

6. A pipe making machine for producing tubing sections from flat blanks of thin metal stock, including in combination: a blank-receiving station where a said blank is deposited in a horizontal position supported only at its longitudinal edges; a folding station; means to feed said blank to said folding station, said folding station including means for engaging only said edges and adjacent margins of said blank while moving said edges in toward each other, thereby flexing said blank freely and without undue stress into a U-shape; longitudinally movable semi-circular support means for shaping the central circular portion of the lower surface of said blank; a longitudinally movable cylindrical mandrel; a lost-motion connection between said mandrel and said support means; means for moving said mandrel in a single uninterrupted movement from one end of its stroke to the other, said mandrel sliding across said blank to thereby smooth out and catch said flexed blank between said mandrel and said semicircular support means and engaging said lost-motion connection so as thereafter to move said mandrel, blank, and support means together; means for crimping the edges of the flexed blank; means for closing said blank about said mandrel during said movement, the walls of said blank being free at all times during the closing to slide lengthwise along said closing means; and means for seaming the longitudinal crimped edges of said blank during movement thereof but only after the full length of said edges have been fully closed about said mandrel.

7. The machine of claim 6 in which said blank-closing means comprises a pair of longitudinally extending dies with arcuate faces, at least one end of each of which is adapted for lateral sliding movement, and means for moving each said end laterally to close said dies about said blank and to close said blank about said mandrel.

8. The machine of claim 7 in which only the ends of each die closer to said edge-engaging means is slidable, the other end being pivotally mounted on a stationary bearing, said blank and mandrel entering said die while said slidable end is spread apart so that the blank is progressively closed from its forward end; said slidable ends then being moved in toward each other to complete the closing.

9. The machine of claim 6 in which the longitudinal positions of the mandrel and support means determine the action of said edge-engaging means and said closing means.

10. A tube-forming machine of a type capable of continuously producing long, thin-walled, unstressed tubing sections, one at a time, each from a flat blank of thin metal stock, including in combination: a stationary blank-receiving station; means for feeding said blanks to said station and depositing them there in a horizontal position, said station supporting said blanks only at their longitudinal edges; means for engaging said edges and an adjacent margin of the lower surface of said blank and moving said edges in toward each other, thereby flexing said blank freely and without undue stress into a U-shape; semicylindrical means to receive and shape the lower surface of the central circular portion of said blank and support the bowl of the U; a longitudinally movable cylindrical mandrel; means to slide said mandrel over said U-shaped blank and the bowl-supporting means into engagement with a portion of said bowl-supporting means, thereby smoothing out said flexed blank and catching it between said mandrel and said bowl-supporting means, and, after such engagement, to carry said mandrel, blank and bowl supporting means longitudinally away from said edge-engaging means at a substantially constant speed; longitudinally-stationary means for crimping the edges of the flexed blank and closing the portions of the blank above the bowl about said mandrel during said movement, the walls of said blank being free at all times to slide lengthwise along said closing means; longitudinally-stationary means for seaming the longitudinal crimped edges of said blank during movement thereof after the blank has been fully closed about said mandrel, so as to complete the tubing section; means for moving the mandrel in the opposite direction to slide it out from said tubing section and said bowl-supporting means; means for removing said tubing section from said mandrel and said support means; and means for retracting said mandrel and support means into their initial positions for processing a succeeding blank.

11. A pipe-making machine for making tubing sections from single sheets of sheet-metal stock, including in combination: a base frame; a pair of long flanged plate sections spaced apart with their longitudinal edges parallel to each other; means secured to each said plate section for pivoting said plate sections about said frame so that said plate sections may swing from a blank-receiving position to a blank-folding position, its flanges engaging the longitudinal edges of said blank; means for depositing one sheet blank at a time on said plate sections when said sections are in their blank-receiving position; a boat having a concave upper face adapted to receive the central portion of said blank when said plate sections are moved to their blank-folding position, shaping said blank into a U shape, said boat being slidable longitudinally along said frame; a mandrel whose outer circumference corresponds substantially to the desired inner circumference of said pipe, said mandrel being slidable longitudinally along said frame and adapted on movement to slide over said blank in its folded position so that the blank is held between said mandrel and said boat, to engage a portion of said boat, and to carry said blank and said boat with said mandrel; means for crimping each longitudinal edge of said folded blank to a desired shape, as said blank is propelled by said mandrel; blank-closing means, comprising two members mounted longitudinally on said frame on opposite sides of said boat adapted to close said blank about said mandrel while the walls of said blank are free at all times to slide lengthwise along the faces of said closing means, so that the tubing blank assumes a natural, unstressed position with the crimped edges closed but unlocked; seaming means for locking said crimped edges together as said blank is propelled by said mandrel, after the closing of the entire longitudinal edges of the blank has been completed; means for retracting said mandrel from boat while disengaging the completed tubing section from said mandrel; means to propel said mandrel back and forth along said frame; and means for returning said boat to its blank-receiving position.

12. A pipe-making machine for making seamed tubing sections from single sheets of sheet-metal stock, including in combination: a base frame; a pair of long flanged plate sections spaced apart with their longitudinal edges parallel to each other; support means secured to each said plate section and pivoted to said frame so that said plate sections may swing from a blank-receiving position where said plate sections lie at a flat angle inclined in toward each other to a blank-folding position where said plate sections lie with their faces vertical, facing and parallel to each other, their flanges engaging the longitudinal edges of said blank; power means pivoted to said main frame and having a pivoted connection to one said plate section for moving each said plate section from its blank-receiving position to its blank-folding position; synchronizing guide means engaging said support means for linking their movement so that both said plate sections pivot at the same rate; means for depositing one blank at a time on said plate sections when said sections are in their blank-receiving position; a boat having a circular-cylindrical concave upper face adapted to receive the central portion of said blank when said plate sections are moved to their blank-folding position, shaping said blank into a U-shape with the extending portions of the blank substantially vertical, said boat being slidable longitudinally along said frame; a cylindrical mandrel whose outer circumference corresponds substantially to the desired inner circumference of said pipe, said mandrel being slidable longitudinally along frame and adapted on movement to slide over said boat into engagement with a projecting portion of said boat so as to hold said blank in its folded position between said boat and said mandrel and to carry said blank and said boat with said mandrel; means for crimping each longitudinal edge of said folded blank to a desired shape, as said blank is propelled by said mandrel; blank-closing means, comprising two members mounted longitudinally on said frame at least one end of each being mounted for sliding lateral movement with respect to said frame; means for moving said slidably-mounted end portions in toward the mandrel, to close said blank about said mandrel while the walls of said blank are free at all times to slide lengthwise along the faces of said closing means, so that the tubing blank assumes a natural, unstressed position with the crimped edges closed, but unlocked; seaming means for locking said crimped edges together as said blank is propelled by said mandrel, after the closing of the entire longitudinal edges of the blank has been completed; means for retracting said mandrel from said boat while removing the completed tubing sections from said mandrel; means to propel said mandrel back and forth along said frame; and means to return said boat to its blank-receiving position while stripping said tubing section therefrom.

13. A machine for automatically making complete tubing sections from single-sheet blanks of thin, substantially flat, sheet-metal stock, including in combination: a base frame of extended length; a pair of long plate sections having their upper longitudinal edges flanged over for its full length to provide hook flanges, said sections being spaced apart from each other, their longitudinal edges being parallel to each other; means for depositing one flat blank at a time on said plate sections when said sections are in their blank-receiving position; support means rigidly secured to each said plate section and pivoted to said frame so that said plate sections may be swung from a blank-receiving position where said plate sections lie at a flat angle inclined in toward each other to a blank-folding position where said plate sections are substantially vertical, facing and parallel to each other with their hook-flanges engaging the longitudinal edges of said blank; a pair of pneumatic cylinders, each pivoted to said main frame and having a piston rod pivoted to one said plate section for pivoting each said plate section from its blank-receiving position to its blank-folding position; synchronizing guide means engaging both said support means for linking their movement so that when one said plate section pivots, the other one pivots at the same rate; a boat having a circular-cylindrical concave upper face adapted to receive the central portion of said blank when said plate sections are moved to their blank-folding position, for shaping said blank into a U shape with the bowl of the U cylindrical and of the radius of the tubing section to be made and with the extending portions of the blank substantially vertical, said boat being slidable longitudinally along said frame; a cylindrical mandrel whose outer circumference corresponds substantially to the desired inner circumference of said pipe, said mandrel being slidable longitudinally along said frame, said mandrel being adapted on movement in one direction to slide over said boat into engagement with a projecting portion of said boat so as to hold said blank in its folded position between said boat and said mandrel and to carry said blank and said boat with said mandrel in that direction until said blank has been formed completely into seamed tubing; blank edging means for crimping each longitudinal edge of said folded blank to a desired shape, as said blank is propelled by said mandrel past said blank-edging means; blank-closing means, comprising two members with generally quarter-cylindrical faces extending longitudinally of said frame, each being mounted at the end closer to said blank-edging means for sliding lateral movement with respect to said frame, and having a pivoted connection to the frame at the other end, wherein said folded and edge-crimped blank has its vertically extending portions forced in around said mandrel by said closing faces; pneumatic-cylinders each mounted to said frame on horizontal pivots and having its piston pivotally secured to one said blank-closing means, for moving the slidably-mounted end thereof in toward the mandrel, to close said blank about said mandrel while the walls of said blank are free at all times to slide lengthwise along the faces of said closing means, so that the tubing blank assumes a natural, unstressed position with the crimped edges closed but unlocked; seaming means for locking said crimped edges together as said blank is propelled by said mandrel, after the closing of the entire longitudinal edges of the blank has been completed; stripping means adapted to permit entry of said mandrel, the tube formed from said blank, and said boat, but to strip said tube from said mandrel upon movement of the mandrel in the opposite direction out from said boat; a chain loop having power means for moving it around said loop and a connection to said mandrel for propelling said mandrel reciprocally from the blank-feeding position past the stripping means and back again, said mandrel disengaging from said boat upon reversal of its motion; lug means on said mandrel adapted to engage said boat after reversal and carry said boat back to its blank-receiving position; means to supply compressed air to said cylinders for moving their pistons back and forth; control means located along said frame for controlling said compressed-air supply means and determine which way their pistons move; and means moving with said boat and said mandrel for actuating said control means according to the position of said boat and said mandrel along said frame.

14. In a pipe-making machine for making seamed tubing sections automatically from single-sheet blanks of thin, substantially flat, sheet-metal stock, the combination of: a base frame of extended length; a pair of spaced-apart long plate sections having their upper longitudinal edges flanged to provide hook flanges, corresponding longitudinal edges of a pair being substantially parallel to each other; support means secured to each said plate section and pivoted to said frame so that said plate sections may be swung from a blank-receiving position where said plate sections lie at a flat angle inclined in toward each other to a blank-folding position where said plate sections lie with their faces vertical, facing and parallel to each other with the hook-flanges engaging the longitudinal edges of said blank; means for depositing one flat sheet blank at a time of said stock on said plate sections when said sections are in their blank-receiving position; a pair of pneumatic cylinders, each pivoted to said main frame and having a piston rod pivoted to one said plate section for pivoting each said plate section from its blank-receiving position to its blank-folding position; a boat having a circular-cylindrical concave upper face adapted to receive the central portion of said blank when said plate sections are moved to their blank-folding position, shaping said blank into a U-shape with the bowl of the U cylindrical and of the radius of the tubing section to be made and with the extending portions of the blank substantially vertical, said boat and said plate sections providing the sole support for the blank at this state; a cylindrical mandrel whose outer circumference corresponds substantially to the desired inner circumference of said pipe, said mandrel being slidable longitudinally along said frame, said mandrel being adapted on movement to slide over said blank in its folded position and, when overlying said blank, to engage a projecting portion of said boat and carry it and said blank in one direction until said blank has been formed completely into seamed tubing; and means for crimping the edges and then closing said blank about said mandrel, and finally seaming the crimped edges, during the movement of said mandrel.

15. In a continuous process for making seamed thin-walled tubing, the wall being of a thickness in the order of $\frac{1}{50}$ or less of the diameter of the finished tube, from long rectangular blanks curved widthwise into a generally U-shaped cross-section, the improvement comprising the steps of crimping the longitudinal edges of said blanks, then applying pressure to the crimped edges to close them together around a mandrel into an unseamed closed cylindrical tube free from longitudinal stresses, and then, only after said edges are closed together for their entire length, seaming the closed-together crimped edges.

16. A method for making thin-walled pipe substantially free from internal stresses from single sheets of substantially flat sheet stock, the pipe wall being of a thickness in the order of 1/50 or less of the diameter of the finished pipe, as a continuous process, comprising the steps of: feeding said sheets one at a time while substantially flat; applying pressure to the opposite longitudinal side edges only of a fed sheet to force those edges toward each other free from other contact, so as to flex the sheet so that it is generally U-shaped as seen in cross-section; then moving said U-shaped blank longitudinally while, first, crimping said side edges, second, moving the crimped edges together about a mandrel for the full length of said edges, and, third, only after said crimped edges are together to form a closed unseamed tube, progressively seaming said edges.

References Cited in the file of this patent

UNITED STATES PATENTS

| | | |
|---|---|---|
| 338,567 | Smith | Mar. 23, 1886 |
| 343,024 | Gordon et al. | June 1, 1886 |
| 426,641 | Hischheimer et al. | Apr. 29, 1890 |
| 473,019 | Plecker | Apr. 19, 1892 |
| 508,350 | Shipe | Nov. 7, 1893 |
| 563,255 | Briggs | July 7, 1896 |
| 766,531 | Schlafly | Aug. 2, 1904 |
| 2,116,971 | Haslauer | May 10, 1938 |
| 2,474,652 | Block | June 28, 1949 |
| 2,644,416 | Miller | July 7, 1953 |